Oct. 30, 1956 K. H. ANDREN 2,768,425
ART OF PRODUCING ELECTRICAL CONDUCTORS
Filed March 9, 1954 6 Sheets-Sheet 1
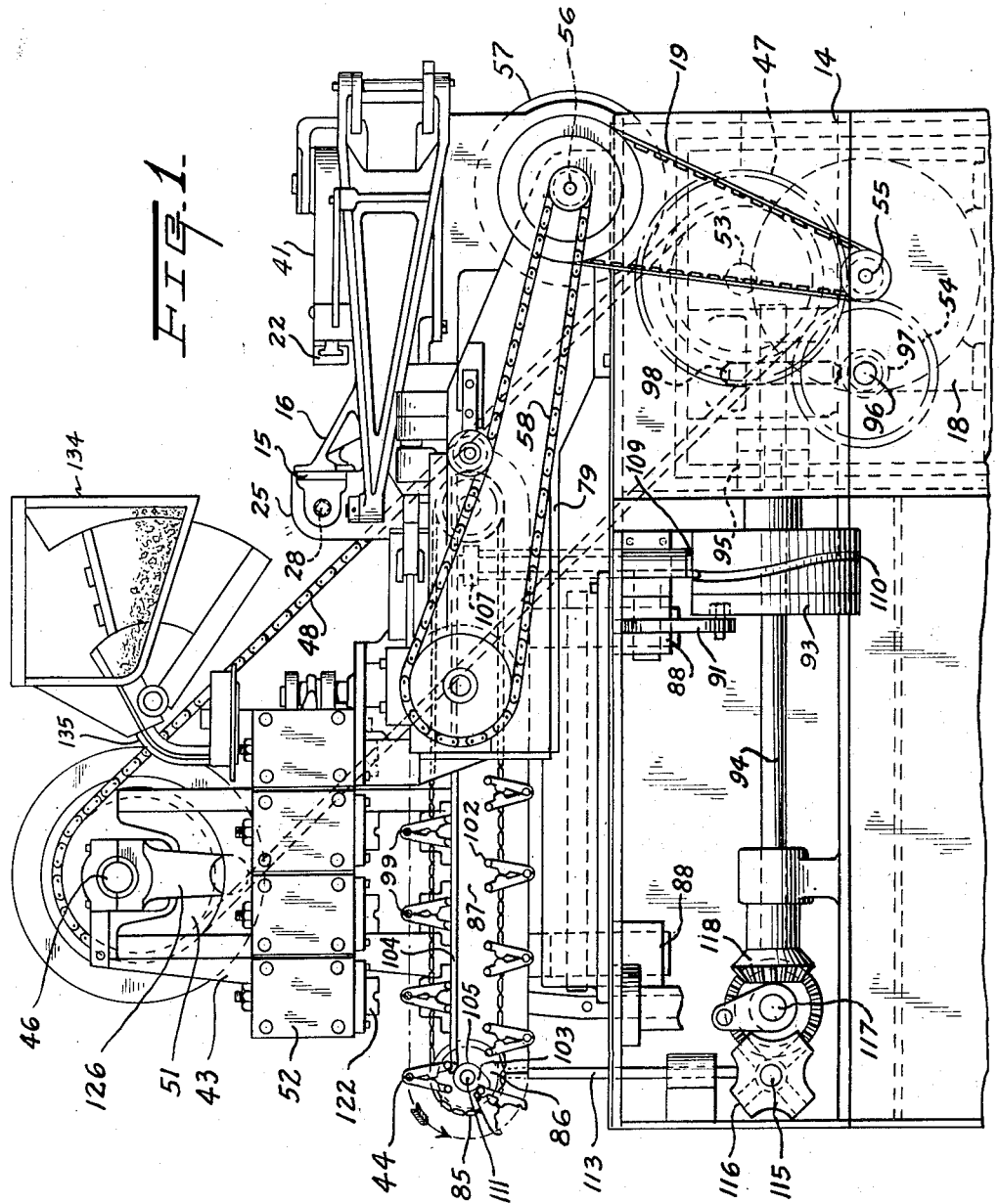
INVENTOR.
K. H. Andren
BY
Lieber & Lieber
ATTORNEYS.

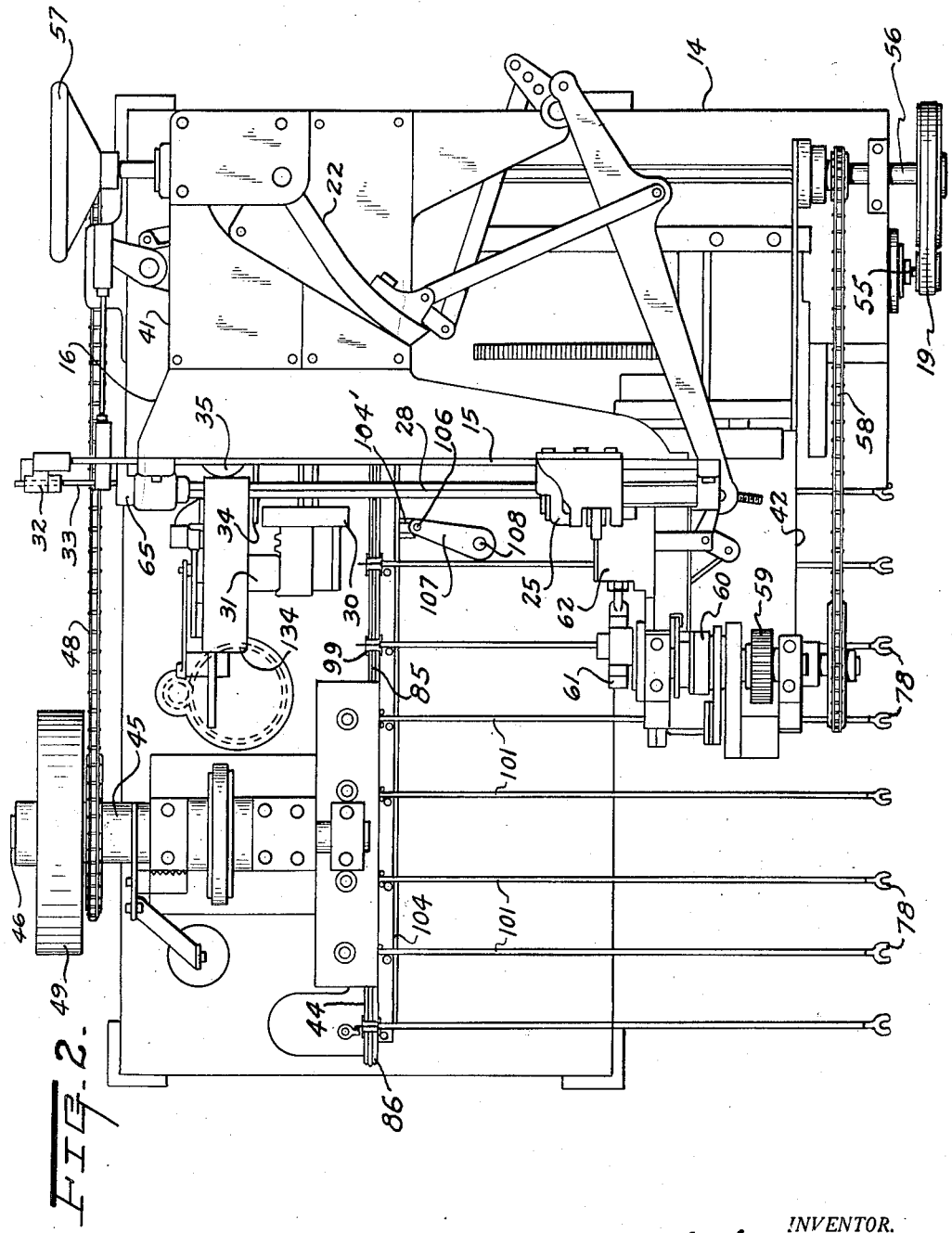

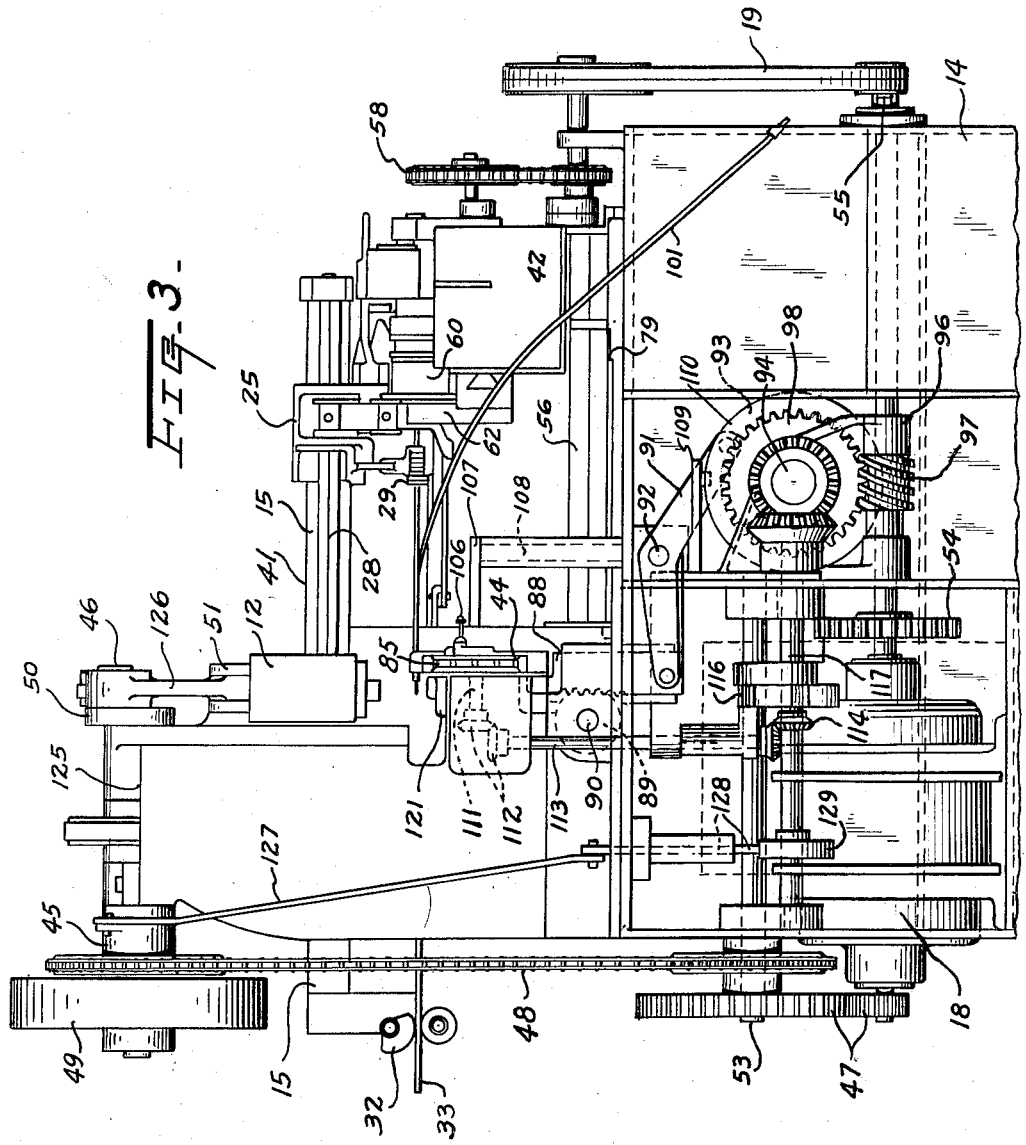

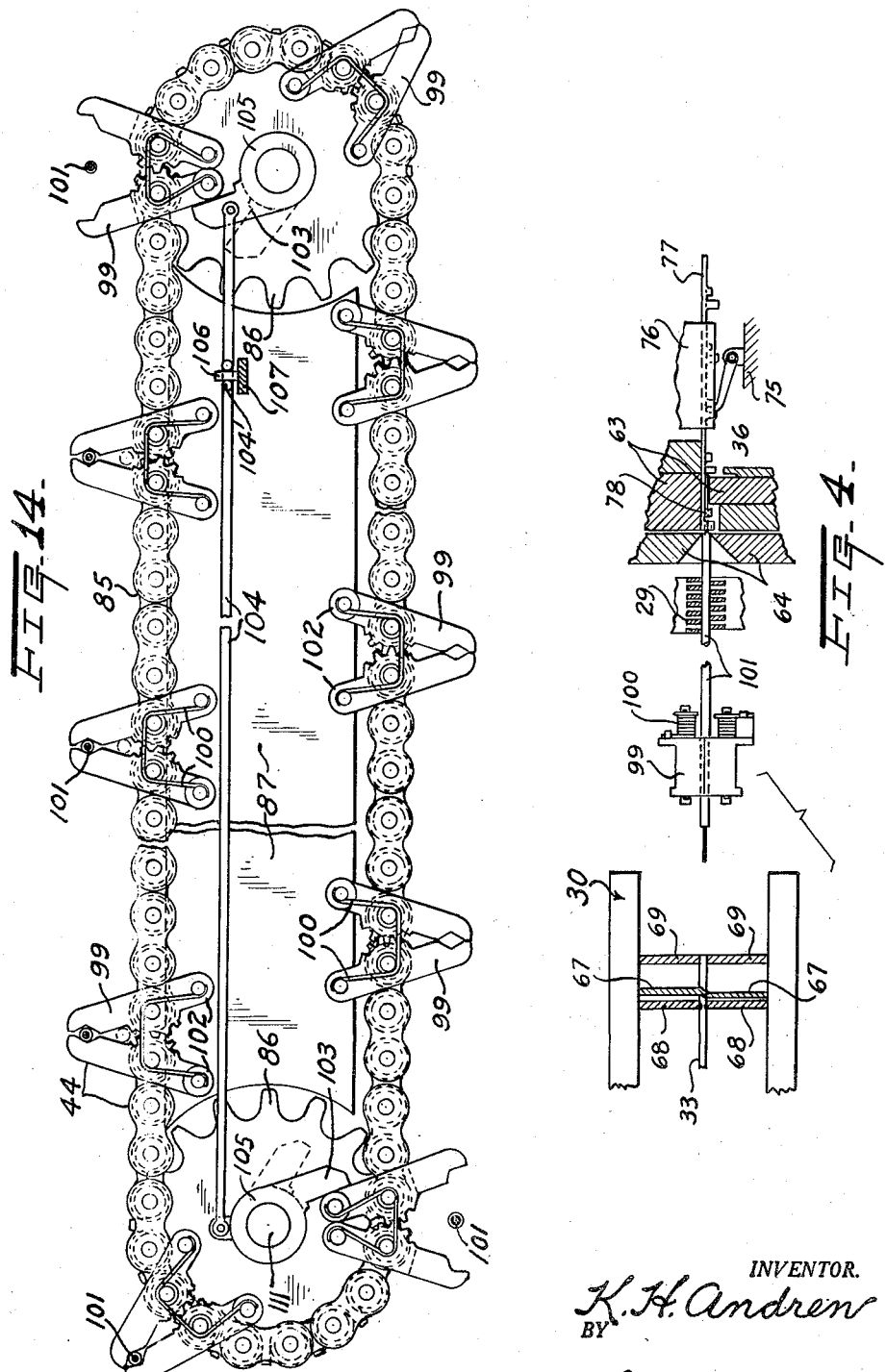

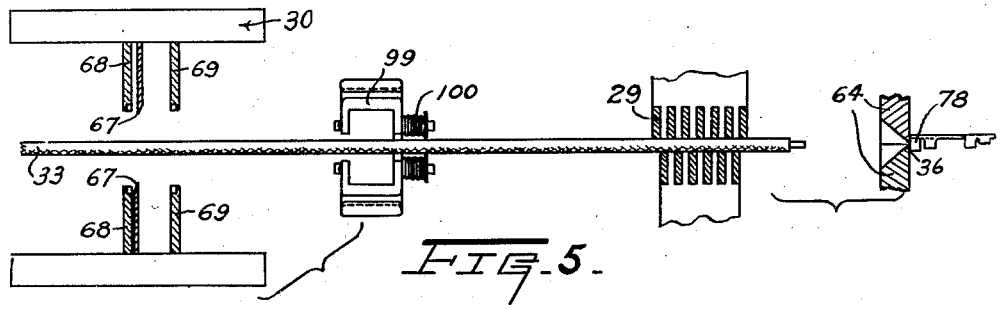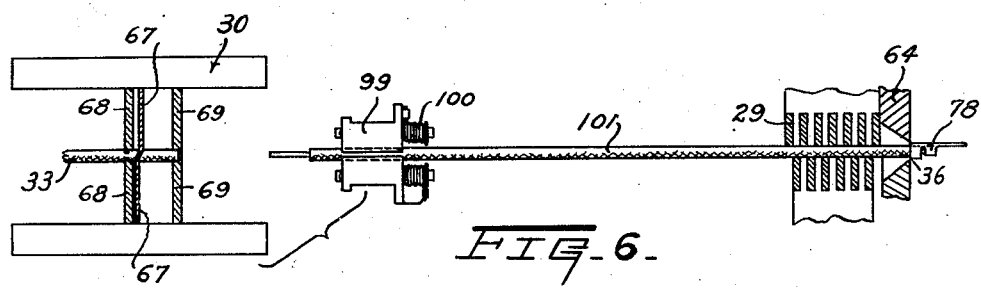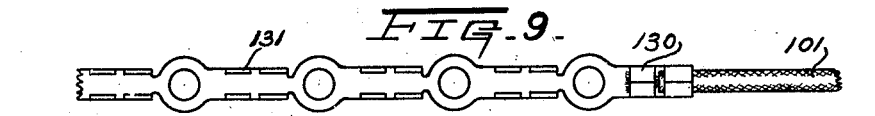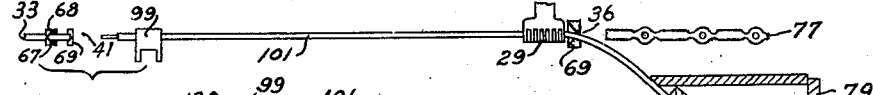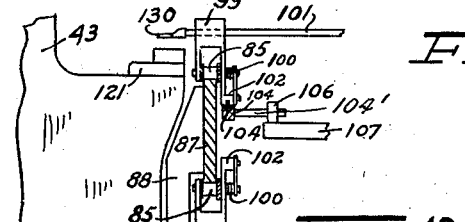

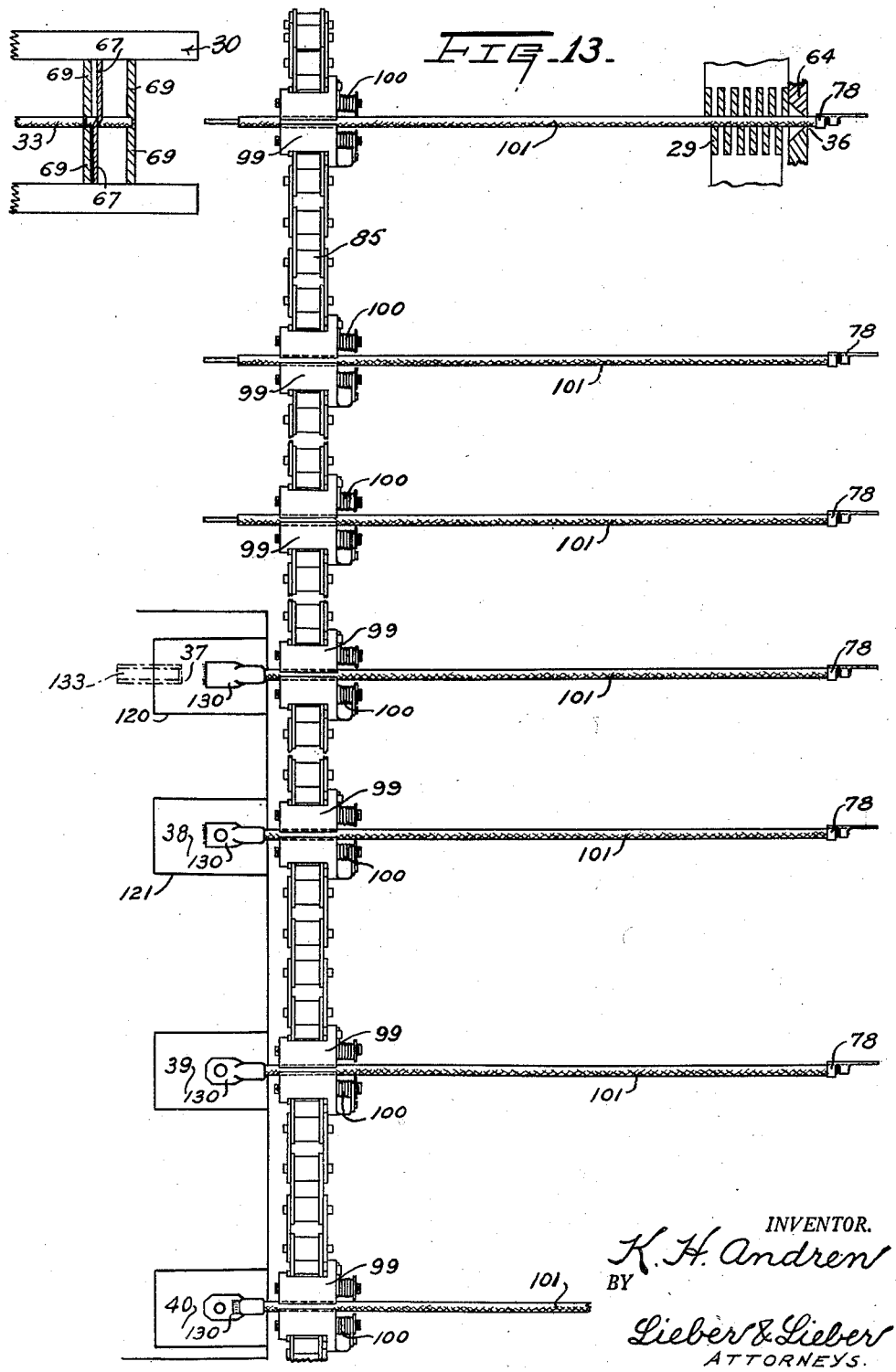

United States Patent Office 2,768,425
Patented Oct. 30, 1956

2,768,425

ART OF PRODUCING ELECTRICAL CONDUCTORS

Karl H. Andren, Greenfield, Wis., assignor to Artos Engineering Company, Milwaukee, Wis., a corporation of Wisconsin Application March 9, 1954, Serial No. 415,026

5 Claims. (Cl. 29—155.55)

This invention relates generally to improvements in the art of producing electrical conductors, and relates more specifically to an improved method of and apparatus for manufacturing electrical conductors each comprising an insulated wire having a terminal attached to one or both ends thereof.

The primary object of my present invention is to provide an improved method of rapidly and effectively producing successive electrical conductors wherein terminals are attached to insulated wires, together with improved apparatus for automatically exploiting the method with utmost precision.

It has long been customary to utilize enormous quantities of electrical conductors each formed of a predetermined length of insulated wire having an attaching terminal secured to either one or both of its opposite ends, for the purpose of assembling diverse types of electrical equipment and systems. These conductors must have the terminals firmly attached to the wire ends so as to insure efficient electrical connections, and to avoid having the terminals dislodged by the application of longitudinal pulls on the wires, and each of the successive wires should also be of definite predetermined length. Then too, the cutting, stripping and terminal attachment steps involved in the manufacture of such conductors must preferably be carried on rapidly and automatically but in a most dependable manner, in order to reduce the cost of production of successive perfect conductors to a minimum, and although various methods of an apparatus for producing such conductors have heretofore been proposed and used they have not proven commercially satisfactory for various reasons.

It is therefore an important object of the present invention to provide an improved method of manufacturing electrical conductors from successive predetermined lengths of insulated wire and having one or more terminals attached thereto, in a most effective manner and with great rapidity.

Another important object of this invention is to provide simple and automatically functioning apparatus for carrying on the several steps of the improved method in a most dependable manner.

A further important object of the invention is to provide an improved system for effectively producing successive electrical conductors of any predetermined length with utmost precision, and in a manner whereby terminals of various types may be securely attached to the current conducting wires.

Still another important object of my invention is to provide a compact mechanism for firmly fastening terminals to either or both ends of a succession of exceptionally long rapidly moving wires immediately after they are severed from a source of wire stock, and which performs the successive operations both effectively and accurately without interference with previous operations.

An additional object of the present invention is to provide an automatic electrical conductor production machine which may be conveniently adjusted and operated to manufacture conductors of different kinds in rapid succession and with minimum attention and cost.

These and other objects and advantages of the invention will be apparent from the following detailed description from which it will be noted that the gist of the improvement is the provision of a method of producing electrical conductors in rapid succession by initially feeding insulated wire stock from a source of supply longitudinally through and beyond a cutting and stripping zone, by severing and stripping the insulation from one or both ends of each predetermined length of wire cut from the stock at the initial zone, and by thereafter transferring the successive severed and end stripped wire lengths laterally away from the cutting and stripping zone through a succession of other zones wherein terminals are attached to either of both of the stripped ends of each wire.

A clear conception of the several steps involved in the improved method and of the construction and operation of a typical machine for automatically exploiting the method, may be had by referring to the drawings accompanying and forming a part of this specification wherein like reference characters designate the same or similar parts in the various views.

Fig. 1 is a side elevation of one embodiment of an improved machine for producing successive electrical conductors of any desired lengths each having a terminal attached to either or both ends thereof, from insulation covered wire stock;

Fig. 2 is a top view of the electrical conductor producing mechanism shown in Fig. 1;

Fig. 3 is a front view of the same mechanism;

Fig. 4 is an enlarged diagram showing one insulated wire length after it has been severed from the wire supply stock and end stripped, and while a terminal is being applied to the end of the wire remote from the cutting and stripping zone;

Fig. 5 is a further enlarged diagram showing a fresh supply of insulated wire stock being pulled longitudinally through and beyond the cutting and stripping zone toward a terminal attaching zone disposed near the free end of the wire;

Fig. 6 is a diagram similar to that of Fig. 5, but showing a wire of predetermined length after it has been severed from the supply stock and a sheet metal terminal has been attached to its end farthest from the initial cutting and stripping zone;

Fig. 7 is a further enlarged longitudinal section through a tubular terminal blank adapted to be attached to either end of an insulation covered wire;

Fig. 8 is a similarly enlarged plan view of a completed terminal formed from a blank such as shown in Fig. 7, and applied to a fragment of a wire;

Fig. 9 is a likewise enlarged plan view of a series of endwise interconnected sheet-metal terminal blanks also adapted to be attached in succession to successive lengths of insulated wire, showing the end terminal of the series actually secured to a wire fragment;

Fig. 10 is a somewhat reduced plan view of a series of laterally interconnected sheet-metal terminal blanks which may also be successively attached to successive wire lengths, likewise showing one of the terminals actually secured to a wire fragment;

Fig. 11 is a further reduced diagram illustrating the manner in which the improved machine will handle and apply terminals to the ends of successive wires having greater length than each individual stock feeding stroke of the mechanism;

Fig. 12 is an enlarged view of a portion of the improved electrical conductor producing machine, viewed as in Fig. 3;

Fig. 13 is a diagram somewhat similar to Figs. 5 and 6, but illustrating the several steps involved in applying terminals of the type shown in Figs. 7 and 8 to the ends of the successive wire lengths nearest to the initial cutting and stripping zone and after the wires are being delivered laterally away from this initial zone; and Fig. 14 is an enlarged fragmentary side elevation of the wire transfer conveyor with some of its wire gripping jaws and their actuating mechanism, which are shown diagrammatically in Fig. 1.

While the machine for carrying on the improved electrical conductor producing method and which is illustrated and described herein, is especially adapted to attach only two well known types of terminals to opposite ends of the successive wires cut from the supply stock, it is not my desire or intention to unnecessarily restrict the invention by virtue of this limited showing; and it is also contemplated that specific descriptive terms employed herein be given the broadest possible interpretation consistent with the disclosure.

In carrying on the commercial exploitation of my present method it is preferable to utilize a wire cutting and stripping mechanism similar to that shown and described in my Patent No. 2,680,394, granted June 8, 1954, and comprising in general a main frame 14 having a slide beam 15 mounted thereon by means of a support 16; an electric propelling motor 18 mounted upon the frame 14 and being connected by an endless timing drive 19 to speed reducing mechanism housed within the frame; a feed lever 22 periodically movable by the speed reducing mechanism and being drivingly connected to a wire feeding clamp assemblage 25 slidably mounted upon the bar 15 and which is operable by a square shaft 28 having round supporting ends and is periodically oscillatable about its axis to open and close the jaws 29 of the clamp assembly 25; a wire cutting and stripping device assemblage 30 having a fixed subframe 31 and an incoming wire guide 32 cooperable with the wire supply stock 33; a pair of wire stock holding fingers 34 cooperable with the entering wire stock 33 between the guide 32 and the assemblage 30; and long wire length cutting mechanism 35 mounted upon the frame 14.

A terminal attaching unit 42 is mounted upon the main frame 14 so as to accommodate incoming wires of various lengths passing through the assemblage 30, and the unit 42 is driven in synchronism with the assemblage 30 by means of a splined driving shaft 56, a chain drive 58, gearing 59, and a one revolution clutch 60. The clutch 60 may be tripped by a solenoid energized by a switch associated with the long wire length cutting attachment 35 so as to operate only a single time for each wire length produced, and the unit 42 is preferably provided with interchangeable tool units 62 for performing diverse operations and which are drivingly connected to a crank shaft 61. These tool units 62 may be constructed as in my Patent No. 2,497,112, granted February 14, 1950, and should be quickly interchangeable to cooperate with terminals of various types and sizes, and each unit includes forming and cut-off members 63, and opposed guide slides 64 adapted to simultaneously open and close so as to permit the entrance of terminal strip stock and discharge of finished conductor assemblages. Each tool unit 62 also has its own strip feed 75 and terminal strip guide 76 for the sheet metal terminals 78 which are to be severed and attached, and the frame 79 for the terminal attaching unit is mounted upon the main frame 14, see Figs. 1 to 4 inclusive.

The transfer conveyor 44 comprises an endless chain 85 coacting with sprockets 86 which are journalled in bearings carried by a plate 87 supported by two racks 88 drivingly interconnected by gears 89 and a shaft 90. One of these racks 88 is movable by a lever 91 having a fulcrum 92 and an arm coacting with a rotary cam 93 mounted upon a shaft 94 which is rotatable by means of a one revolution clutch 95 from the driving motor 18 through the spur gears 54, a shaft 96, a worm 97, and a worm wheel 98. The chain 85 is supported by the carrier plate 87, and has a series of cooperating pairs of wire gripping jaws 99 mounted thereon. The jaws 99 of each pair are fulcrumed upon selected link connecting pins of the chain 85, and the complementary jaws of each pair are geared to each other near their pivot pins so as to open and close simultaneously and systemmatically, see Figs. 1 and 12. The jaws 99 of each pair are normally pressed lightly toward each other by means of springs 100 so as to firmly hold and carry the insulated wire lengths 101 while still permitting the intervening wires 101 to slide longitudinally between the jaws 99 when the clamping fingers 29 pull the insulation from the trailing end of the wire and deliver the leading end into a terminal 78. Two of the cooperating sets of the jaws 99, one for receiving a fresh length of wire stock 33, and the other for discharging a completed conductor assemblage, may be opened simultaneously by causing arms 103 to press against jaw extensions 102, these arms 103 having supporting hubs 105 and being secured to an operating bar 104 as shown in Fig. 14. This operating bar 104 is in turn operable by a pin 106 carried by a lever 107 which is movable by means of a shaft 108 and cam arm 109 coacting with another cam 110 mounted on the shaft 94, see Figs. 2, 12 and 14.

One of the sprockets 86 is drivingly connected through a shaft 111, bevel gears 112, a telescopically elongatable spline shaft 113, bevel gears 114, a shaft 115, Geneva gearing 116, another shaft 117, and bevel gearing 118, to the driving shaft 94, as best shown in Fig. 1. With this assemblage, whenever the solenoid actuated clutch 95 is tripped from the long cutting attachment or timing mechanism 35, the driving shaft 94 will make one revolution and will function to move the transfer conveyor 44 so as to simultaneously open the discharge jaws 99 of one set, and the receiving jaws 99 which are positioned remote from the discharge jaws directly beneath the incoming wire stock 33. When these receiving jaws 99 are thus separated, the conveyor 44 is elevated by the rocks 88 and gears 89 and the receiving jaws are closed against the incoming wire stock 33, and after the clamp 25 has completed its stripping stroke, the conveyor chain 85 will function to index while the receiving jaws 99 are still elevated and will subsequently drop to the starting point. This movement of the transfer conveyor will thus also lift each severed wire length 101 from one die 120 and transfer the same to succeeding dies 121 and under the punches 122 so as to lower the partially finished terminal in proper position upon these subsequent dies 121 and under punches 122 until the conductor has been completed, see Fig. 13.

The terminal attaching unit 42 comprises a punch press frame 125 fixedly mounted upon the main frame 14 and carrying a slide 51 on which various types of tool sets 52 each including punches 122 and dies 120, 121, may be mounted. This slide 51 is connected to a crank 50 by a connecting rod 126, and the crank 50 has a one revolution clutch 45 secured thereto, and which is operable by a trip rod 127, a slide 128, and a cam 129 carried by the shaft 117. The one revolution clutch 45 is adapted to engage a fly wheel 49 which is driven by a chain drive 48, and the lower sprocket of this drive is attached to a drive shaft 53 which is driven from the motor 18 through the gearing 47, see Fig. 1.

Whenever the clutch 95 has been tripped and the shaft 94 revolves, the transfer conveyor 85 will function to lift each of the wires 101 and the terminals associated therewith, away from the adjacent dies 120, 121 and punches 122, and to transfer these elements to the next die assemblage and lower the elements thereon, and the cam 129 will operate through the slide 128 and link 127 to trip the clutch 45, the crank 50 will make one revolution and the various tool units 52 will function to step by step complete the terminal 130.

These terminals 130 may be produced either from tubular blanks 133 as shown in Fig. 7, or from sheet metal endwise united blanks 131 as shown in Fig. 9, or from laterally joined sheet metal blanks 132 as shown in Fig. 10, and they may be attached to either or both ends of each severed wire 101. The terminals may also be applied either directly to the stripped ends of the wires 101, or to the insulation with prongs piercing the latter and contacting the metal wires; and when tubular blanks 133 are utilized, these may be supplied from a hopper 134 through a chute 135 as illustrated in Fig. 1. When interconnected sheet metal terminal blanks 131, 132 are utilized, the strips of blanks may be fed to the zones of application with mechanism such as shown in Fig. 4, and other types of terminals may also be utilized.

When the improved electrical conductor producing machine has been constructed as hereinabove described, it may be operated to automatically exploit my improved production method and to manufacture successive complete conductors with one or more terminals attached to each, substantially as follows. After the machine has been adjusted to produce terminals of the desired length, the various parts may be set in motion by operating the motor 18, whereupon successive equal lengths of insulated wire stock 33 will be withdrawn from the wire supply source by the reciprocating gripping jaws 29 of the feeding clamp assemblage 25 while the resilient holding jaws 99 nearest to this assemblage and the cutting and stripping elements 67, 68, 69 are separated as in Fig. 5. The jaws 99 will close after the feeding clamp jaws 29 have withdrawn the required length of wire 101 and the leading end of this wire is about to be pushed into a terminal 78 constituting one of a series of blanks 130 or 131, whereupon the cutting blades 67 will sever the wire 101 from the stock 33 and the stripping blades will simultaneously sever the insulation adjacent to the cut. The mechanism for feeding the successive lengths of wire 101 into the machine and for severing these lengths from the wire stock 33 while simultaneously severing the insulation, may be similar to that shown in my prior Patent No. 2,680,394, granted June 8, 1954.

While the holding jaws 99 are frictionally engaging the severed wire 101, the feeding clamp jaws 29 will pull the severed trailing end of the wire 101 away from the knives 67 and the severed end of the stock 33 will also be pulled away from these knives to strip the insulation from the wire ends adjoining the cut as in my prior Patent No. 2,497,112, and the longitudinal movement of the severed wire will simultaneously inject the previously stripped leading wire end into the waiting terminal blank 78 through the wire guides 64, as depicted in Fig. 6. The terminal 78 may then be clamped upon the leading end of the wire 101 while the feed clamp 29 is still actively engaging the wire, or this clamp 29 may be released so as to permit the severed wire 101 to be held only by the adjacent holding clamp carried by the conveyor chain 85.

Upon release of the feed clamp 29, the conveyor chain 85 will function to carry the wire with the leading end terminal applied, by successive steps laterally away from the cutting and stripping zone 41 toward the other terminal applying zone 37, as shown in Fig. 13. Here a tubular blank 133 may be slipped over the trailing end of each successive wire 101 and flattened to snugly coact with the stripped end of the wire, by the die 120. As the wire 101 is subsequently advanced laterally to the next station or zone 38, the hole is punched into the flattened terminal 130; and when the wire is carried by the chain conveyor and clamp 99 to the next station 39 the terminal 130 is trimmed to final shape. The wire 101 may then be released, or it may be carried to a final station 40 where identifying indicia may be stamped upon the terminal 130 to complete the conductor, and all of these operations are carried on automatically step-by-step while the wire 101 is momentarily at rest.

From the foregoing detailed description of the construction and operation of the conductor producing machine, it should be apparent that the invention in fact provides a method of manufacturing the electrical conductors in rapid succession and with utmost precision. The successive conductors may be accurately formed with the aid of well known indexing mechanism cooperating with the wire feed as disclosed in my prior Patent No. 2,680,394, and which can be set to produce conductors of any desired length either within or beyond the limit of the feeding stroke of the single reciprocating jaws 29 of the wire feeding clamp assemblage 25, and by causing each severed wire 101 to be transported laterally away from the cutting zone as soon as the severing operation has been effected, the feed jaws 29 are free to perform its next feeding operation without obstruction or interference by previously severed wires 101. The mechanism is also adapted to attach various types of terminals 130 to either or both ends of each wire 101 thereby making it extremely flexible in its adaptations, and the machine performs its function automatically and without excessive attention after it has been properly initially set and adjusted.

It should be understood that it is not desired to limit the invention to the exact construction and performance of the electrical conductor producing mechanism shown and described herein by way of illustration, for various modifications within the scope of the appended claims may occur to persons skilled in the art.

I claim:

1. The method of producing electrical conductors having terminals attached to insulation covered wires, which comprises, feeding insulated wire stock longitudinally through and for a definite distance beyond a cutting zone, severing a definite length of wire from the stock at said zone, moving the severed length of wire longitudinally away from said zone, applying a terminal to the end of the severed length of wire remote from the cutting zone during said longitudinal movement of the wire length, subsequently moving said wire length laterally away from said zone, and applying another terminal to the opposite end of the severed and laterally displaced wire length.

2. The method of producing electrical conductors having terminals attached to insulation covered wires, which comprises, feeding insulated wire stock longitudinally through and for a definite distance beyond a cutting and stripping zone, severing a definite length of wire from the stock and simultaneously cutting through the insulation at said zone, moving the severed length of wire longitudinally away from said zone to strip the pre-cut insulation from said length at the cutting zone, subsequently moving the severed and stripped end of the wire length laterally away from said zone, and thereafter applying a terminal to the stripped end of the laterally displaced wire length.

3. The method of producing electrical conductors having terminals attached to insulation covered wires, which comprises, feeding insulated wire stock longitudinally through and for a definite distance beyond a cutting and stripping zone, severing a definite length of wire from the stock and simultaneously cutting through the insulation at said zone, moving the severed length of wire longitudinally away from said zone to strip the pre-cut insulation from said length at the cutting zone, applying a terminal to the end of the severed length remote from the cutting and stripping zone during said stripping movement of the wire length, subsequently moving the severed and end stripped wire length laterally away from said zone, and applying another terminal to the opposite end of the laterally displaced wire.

4. The method of producing electrical conductors having terminals attached to insulation covered wires, which comprises, feeding successive lengths of insulated wire stock longitudinally through and for a definite distance beyond a cutting zone, severing successive lengths of wire from the stock at said zone, moving each severed length of wire longitudinally away from said zone and applying a terminal to the end of the severed length of wire remote from the cutting zone, subsequently moving each of the successive wire lengths laterally away from said zone, and thereafter applying another terminal to the opposite end of each severed and laterally displaced wire length.

5. The method of producing electrical conductors having terminals attached to insulation covered wires, which comprises, feeding successive lengths of insulated wire stock longitudinally through and for a definite distance beyond a cutting zone, severing successive equal lengths of wire from the stock and simultaneously cutting through the insulation at said zone, moving each severed length of wire longitudinally away from said zone to strip the pre-cut insulation from said length at the cutting zone and applying a terminal to the end of each severed length remote from the stripping zone, subsequently moving each severed and end stripped wire length laterally away from said zone, and applying another terminal to the opposite stripped end of each laterally displaced wire.

References Cited in the file of this patent
UNITED STATES PATENTS

| | | |
|---|---|---|
| 2,225,739 | Elliott | Dec. 24, 1940 |
| 2,688,133 | Berg | Sept. 7, 1954 |
| 2,694,809 | Berg | Nov. 23, 1954 |